Dec. 7, 1937.                C. COPPIN                2,101,212
                          BOILED EGG OPENER
                         Filed Dec. 15, 1936
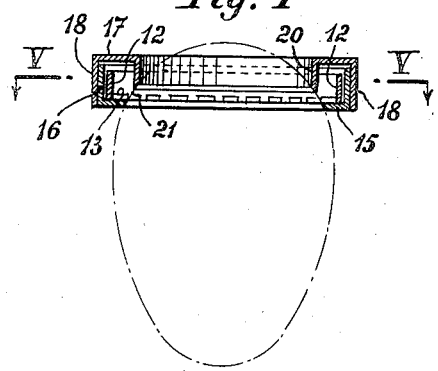
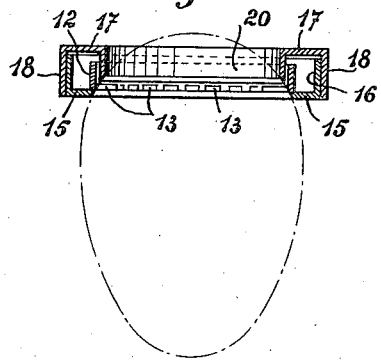
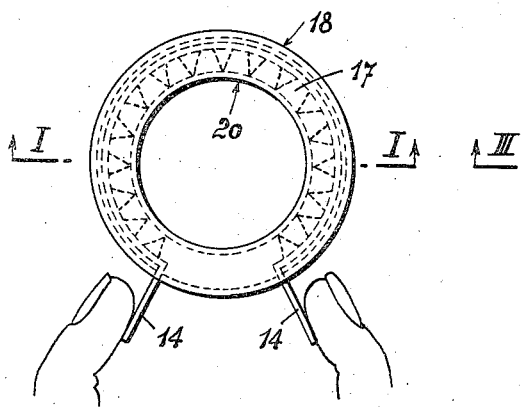
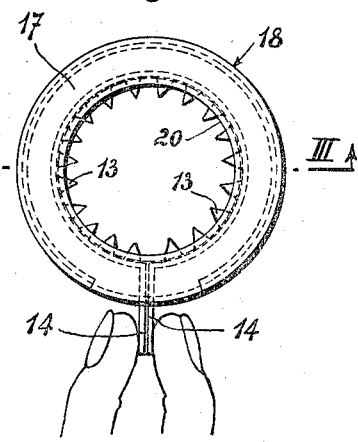
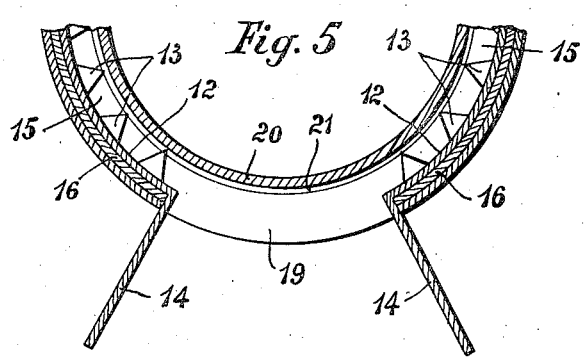
C. Coppin
  Inventor
By Glascock Downing & Seebold
                        Attys.

Patented Dec. 7, 1937

2,101,212

UNITED STATES PATENT OFFICE 2,101,212

BOILED EGG OPENER

Camille Coppin, Brussels, Belgium

Application December 15, 1936, Serial No. 116,033
In Belgium December 31, 1935

2 Claims. (Cl. 146—2)

The invention concerns improvements in openers for boiled eggs which are formed of a resilient open ring provided with teeth on its inner circumference and having finger grips at the extremities.

The invention consists in the fact that the flexible ring is encased within an annular casing the contour of which is provided with an opening allowing the passage of the finger grips while the inner cylindrical wall of the casing is provided with a slot to allow the passage of the teeth and forms a rest for the ring when the grips are pressed together.

The object of the invention is to ensure the uniform penetration of the teeth evenly in a same plane, with a resilient ring the flexibility of which is sufficient to conform itself upon the inner circular face of the casing.

The casing may be made like the bottom and the lid of a circular box, of two halves inserted in one another and liable to be turned one upon the other in variable angular positions and in the exterior walls of which is cut the opening for the passage of the grips, so that the spreading apart of the grips may be settled in accordance with the length of the teeth by modifying the angular dimension of the passage.

The annexed drawing illustrates an example of realization of the invention.

Fig. 1 is an axial vertical section on line I—I of Fig. 2, showing the device with the grips discarded and the teeth inside the casing.

Fig. 2 is a corresponding top view.

Fig. 3 is an axial vertical section on line III—III of Fig. 4, showing the device with the grips brought together and the teeth protruding through the casing.

Fig. 4 is a corresponding top view.

Fig. 5 is a partial section on a larger scale along the line V—V of Fig. 1.

The open ring 12 of flexible metal, preferably rustless steel, is provided with teeth 13 and grips 14 at both extremities. This ring is held in a circular casing formed of a ring shaped body 15 with an outer edge 16 and a cover 17 with an external border 18. The edge 16 engages the border 18 and both are slotted at 19 for the passage and movements of the finger grips 14.

The cover 17 has an inner border 20 leaving between it and the annular bottom 15, a slot 21 which allows the teeth 13 to protrude from the casing when the grips are brought together.

The casing obliges the teeth to move evenly on the same plane and allow the use of a very flexible ring 12, which may be brought to bear on the circular rest 20 when the finger grips 14 are pressed together.

It must be understood that the invention is not limited to the form of realization described and illustrated and that it is independent of the materials used for its execution.

I claim:

1. A device of the character described including an annular box-like sectional casing, one part of which is releasably engageable with the other, the inner periphery of the casing being provided with a horizontal slot extending entirely thereabout, the outer periphery of the casing being provided with an aperture, an open ring-like resilient member removably arranged within the casing and surrounding the inner periphery of the casing and provided with a series of teeth positioned in proximity to the horizontal slot and grips continuing from the ends of the open ring-like resilient member and projecting through and operable in the aperture, whereby when pressed together the resilient member will be guided by the upper and lower walls of the casing and contracted against the inner periphery of the casing and the teeth thereof projected through the horizontal slot in the casing substantially as and for the purposes set forth.

2. A device as claimed in claim 1, in which one casing part is in the form of an annular body portion provided with an outer bordering flange, the other of said casing parts being in the form of an annular cover provided with inner and outer bordering flanges, the outer bordering flange of the cover telescopically engaging the outer flange of the body, and the inner bordering flange of the cover being slightly spaced from the inner periphery of the body to leave the horizontal slot.

CAMILLE COPPIN.